United States Patent
Kasuya

(10) Patent No.: US 12,015,747 B2
(45) Date of Patent: Jun. 18, 2024

(54) IMAGE FORMING APPARATUS HAVING IMPROVED ACCESSIBILITY TO INTERNAL UNITS

(71) Applicant: CANON KABUSHIKI KAISHA, Tokyo (JP)

(72) Inventor: Yoshisuke Kasuya, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/723,039

(22) Filed: Apr. 18, 2022

(65) Prior Publication Data

US 2022/0353380 A1 Nov. 3, 2022

(30) Foreign Application Priority Data

Apr. 28, 2021 (JP) ................................ 2021-076247

(51) Int. Cl.
*H04N 1/00* (2006.01)
*G03G 21/12* (2006.01)

(52) U.S. Cl.
CPC ......... *H04N 1/00543* (2013.01); *G03G 21/12* (2013.01); *H04N 1/00538* (2013.01); *H04N 1/00557* (2013.01); *H04N 1/00615* (2013.01); *H04N 1/00631* (2013.01)

(58) Field of Classification Search
None
See application file for complete search history.

(56) References Cited

U.S. PATENT DOCUMENTS

| | | | |
|---|---|---|---|
| 2003/0222392 A1 | 12/2003 | Matsuyama | |
| 2008/0145122 A1 | 6/2008 | Kaneko | |
| 2010/0247138 A1* | 9/2010 | Kikuchi | G03G 21/1853 399/110 |
| 2013/0315619 A1* | 11/2013 | Shuhama | G03G 15/0189 399/110 |
| 2020/0192270 A1* | 6/2020 | Kase | G03G 21/1853 |
| 2022/0315373 A1* | 10/2022 | Oda | B41J 25/34 |

FOREIGN PATENT DOCUMENTS

| | | |
|---|---|---|
| JP | H09-106238 A | 4/1997 |
| JP | H11-292375 A | 10/1999 |
| JP | 2002-362812 A | 12/2002 |
| JP | 2005-164794 A | 6/2005 |

(Continued)

*Primary Examiner* — Dung D Tran
(74) *Attorney, Agent, or Firm* — Canon U.S.A., Inc. I.P. Division

(57) ABSTRACT

An image forming apparatus for forming an image on a recording medium, the image forming apparatus includes a discharge tray for supporting the recording medium, an internal unit disposed inside the apparatus main body, and a door serving as a part of outer surface members of the apparatus main body, the door being opened and closed to expose and cover an inside of the apparatus main body to the outside, wherein, by opening of the door, a fixing member that fixes the discharge tray to the apparatus main body is exposed to the outside, and removing of the fixing member from the apparatus main body allows the discharge tray to be detached from the apparatus main body without removing the outer surface members other than the door, and wherein detaching of the discharge tray from the apparatus main body allows the internal unit to be accessed.

32 Claims, 12 Drawing Sheets

(56) References Cited

FOREIGN PATENT DOCUMENTS

| JP | 2009-053285 A | 3/2009 |
| JP | 2012-206795 A | 10/2012 |
| JP | 2013-147335 A | 8/2013 |
| JP | 2020-095138 A | 6/2020 |
| JP | 2021-056409 A | 4/2021 |

\* cited by examiner

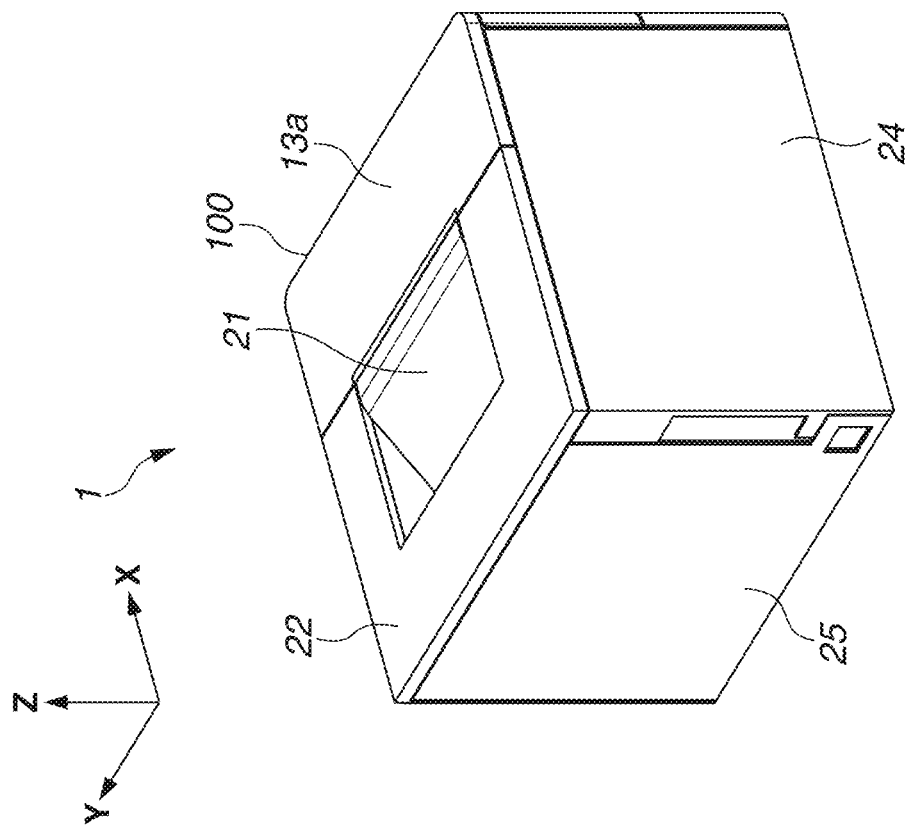
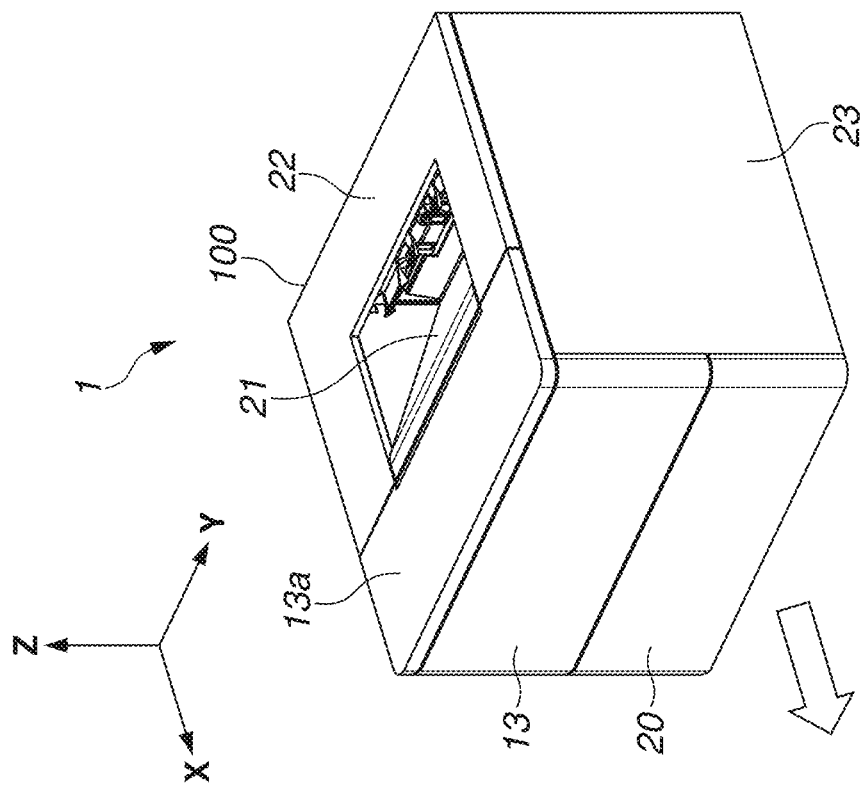

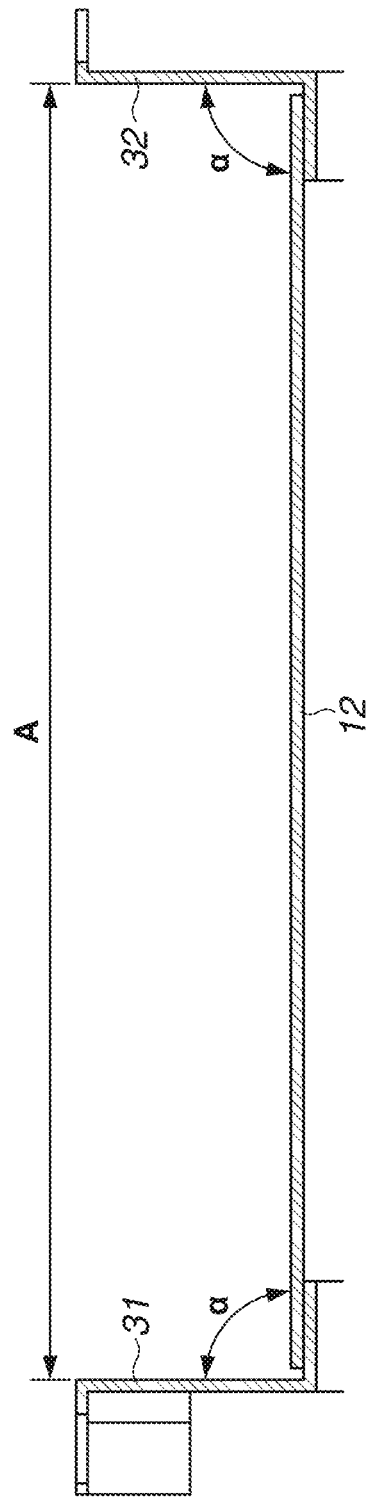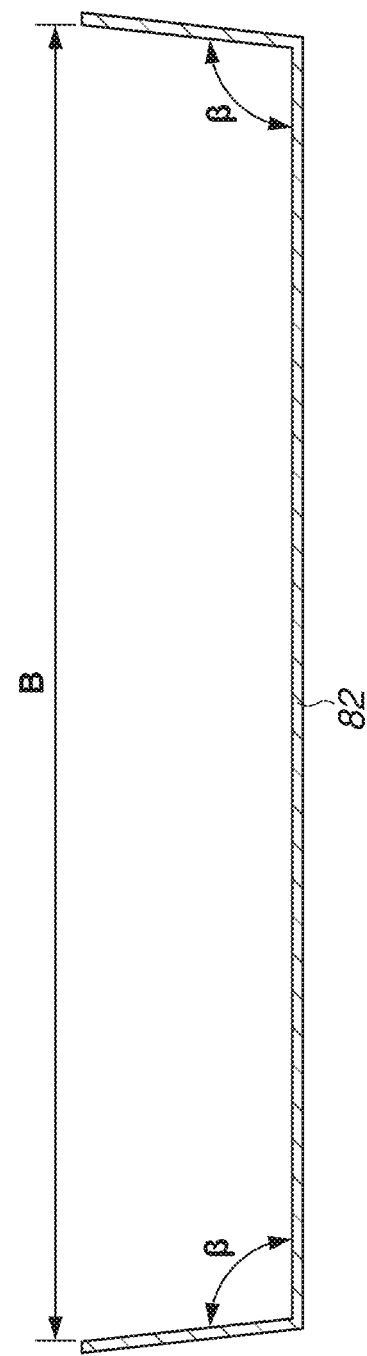

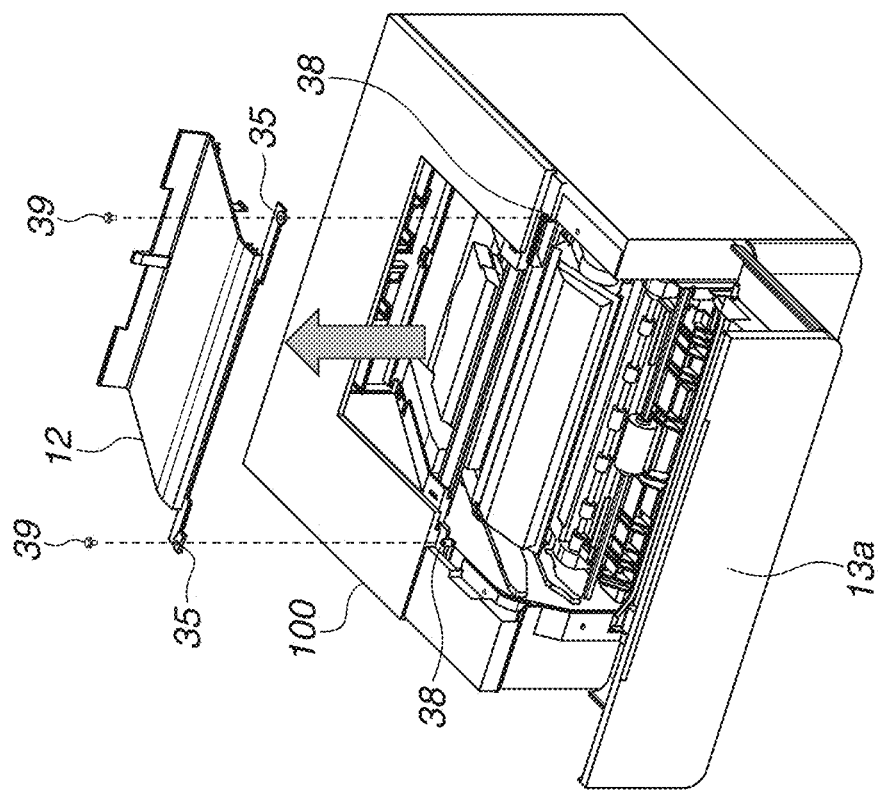
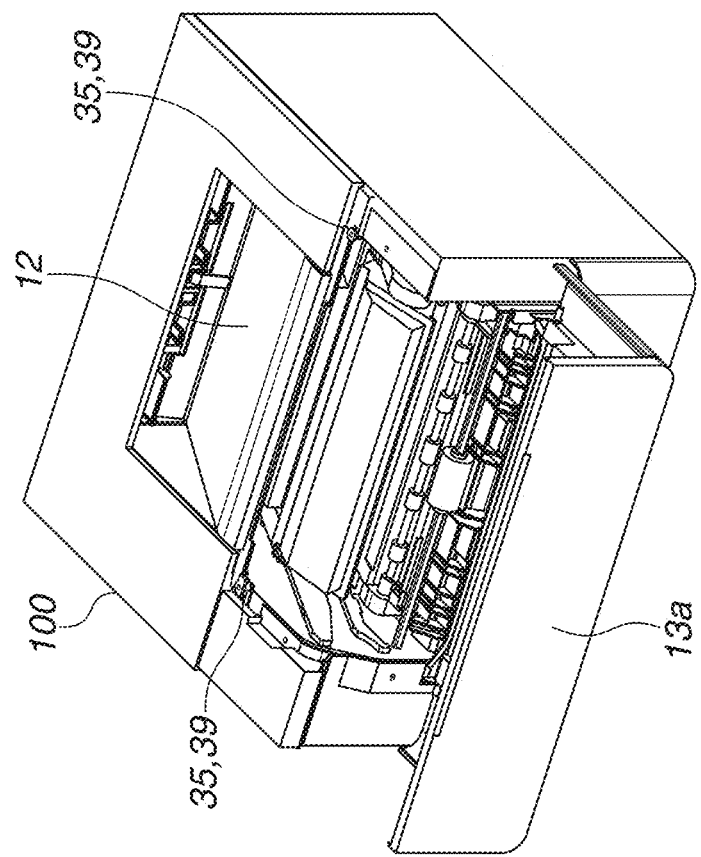

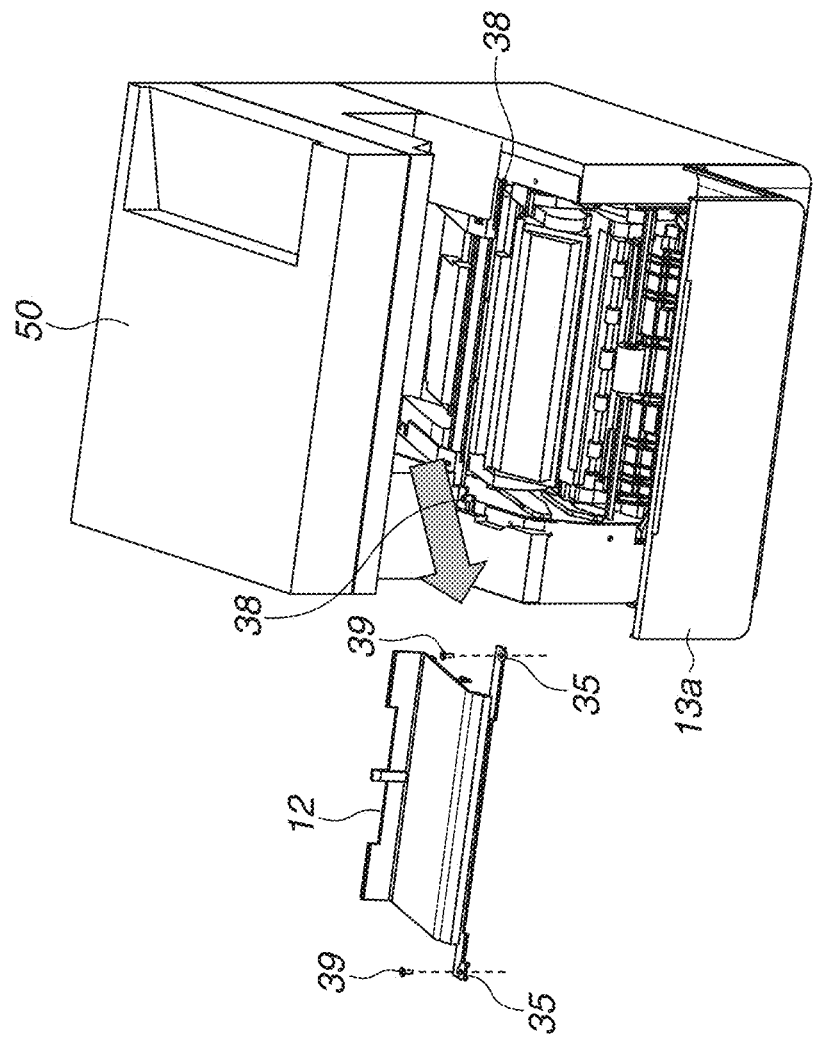
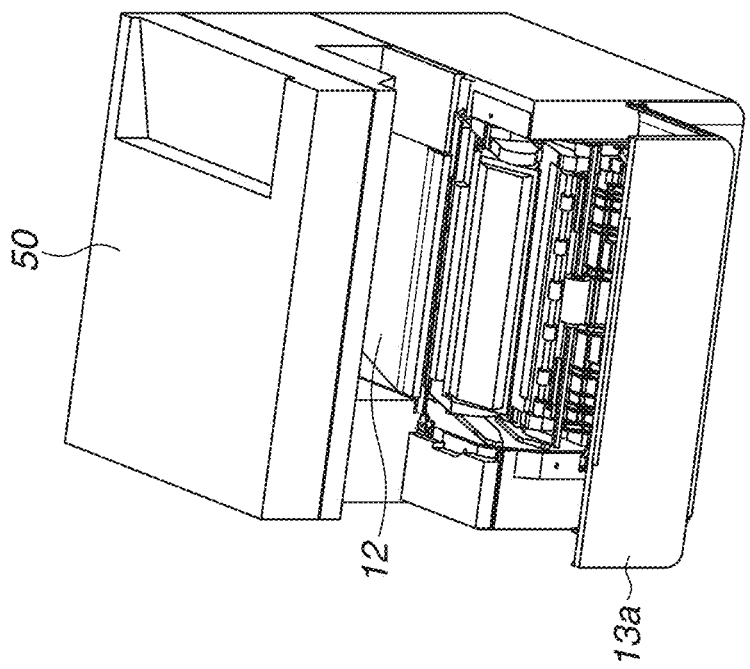

IMAGE FORMING APPARATUS HAVING IMPROVED ACCESSIBILITY TO INTERNAL UNITS

BACKGROUND OF THE INVENTION

Field of the Invention

The present invention relates to an image forming apparatus having an improved accessibility to internal units included in a main body of the image forming apparatus.

Description of the Related Art

In use of conventional image forming apparatuses, such as printers, when an internal unit, such as a scanner unit, disposed inside a main body of the image forming apparatus fails or reaches the end of the life, replacement of the internal unit is performed by a service engineer. The service engineer removes a plurality of outer surface members including a top cover of the main body before replacing the internal unit. In a case where an expansion unit, such as a document reading apparatus, is disposed on the top of a printer, the service engineer needs to perform a complicated work to remove the expansion unit before removing a top cover of a main body of the printer.

In an image forming apparatus discussed in Japanese Patent Application Laid-Open No. 9-106238, an electrical circuit board is disposed inside a main body of the image forming apparatus at a portion below a discharge tray serving as a part of a top cover of the apparatus main body. An opening and closing member is provided on the discharge tray at a portion corresponding to the electrical circuit board, for use in a case where a new board is attached to the electrical circuit board to expand a function. This configuration enables a user to quickly access the electrical circuit board inside the main body of the image forming apparatus from an opening of the opening and closing member.

However, in the configuration discussed in Japanese Patent Application Laid-Open No. 9-106238, the size of the opening and closing member needs to be increased in a case where a new board having an increased size is attached. Consequently, a wide space for opening and closing the opening and closing member needs to be provided, and in addition, in a case where an expansion unit, such as a document reading apparatus, is provided on the top face of the printer, the opening and closing member and the expansion unit may possibly interfere with each other.

In the configuration discussed in Japanese Patent Application Laid-Open No. 9-106238, the portion where the opening and closing member is disposed is recessed from a surface of the discharge tray for stacking a recording medium. Consequently, an edge of the recording medium discharged onto the discharge tray may be caught by the recessed portion, which causes a curl in the recording medium.

SUMMARY OF THE INVENTION

The present invention is directed to providing an image forming apparatus having an improved accessibility to internal units without providing an opening/closing member on the discharge tray.

According to an aspect of the present invention, an image forming apparatus for forming an image on a recording medium, the image forming apparatus includes a discharge tray configured to support the recording medium, on which an image has been formed and which has been discharged to an outside of an apparatus main body of the image forming apparatus, an internal unit disposed inside the apparatus main body, the internal unit being configured to operate in an image forming operation or a conveyance operation for the recording medium, and a door serving as a part of outer surface members of the apparatus main body, the door being configured to be opened and closed to expose and cover an inside of the apparatus main body to the outside, wherein, by opening of the door, a fixing member that fixes the discharge tray to the apparatus main body is exposed to the outside, and removing of the fixing member from the apparatus main body allows the discharge tray to be detached from the apparatus main body without removing the outer surface members other than the door, and wherein detaching of the discharge tray from the apparatus main body allows the internal unit to be accessed.

Further features of the present invention will become apparent from the following description of exemplary embodiments with reference to the attached drawings.

BRIEF DESCRIPTION OF THE DRAWINGS

FIGS. 2A and 2B are diagrams each illustrating a configuration of outer surface members of the image forming apparatus.

FIGS. 4A and 4B are cross-sectional views each illustrating a discharge tray unit configuration.

FIGS. 6A and 6B are diagrams illustrating a procedure for detaching a discharge tray according to a first exemplary embodiment.

FIGS. 9A and 9B are diagrams illustrating a procedure for detaching a discharge tray according to the second exemplary embodiment.

DESCRIPTION OF THE EMBODIMENTS

Preferred exemplary embodiments of the present invention will be illustratively described in detail below. However, dimensions, materials, shapes, and relative arrangements of components according to the following exemplary embodiments are to be modified as required in accordance with the configuration of an apparatus according to the present disclosure and other various conditions. Therefore, unless otherwise specifically described, the scope of the present disclosure is not limited to the following exemplary embodiments.

Overall Configuration of Image Forming Apparatus

Figure 1:
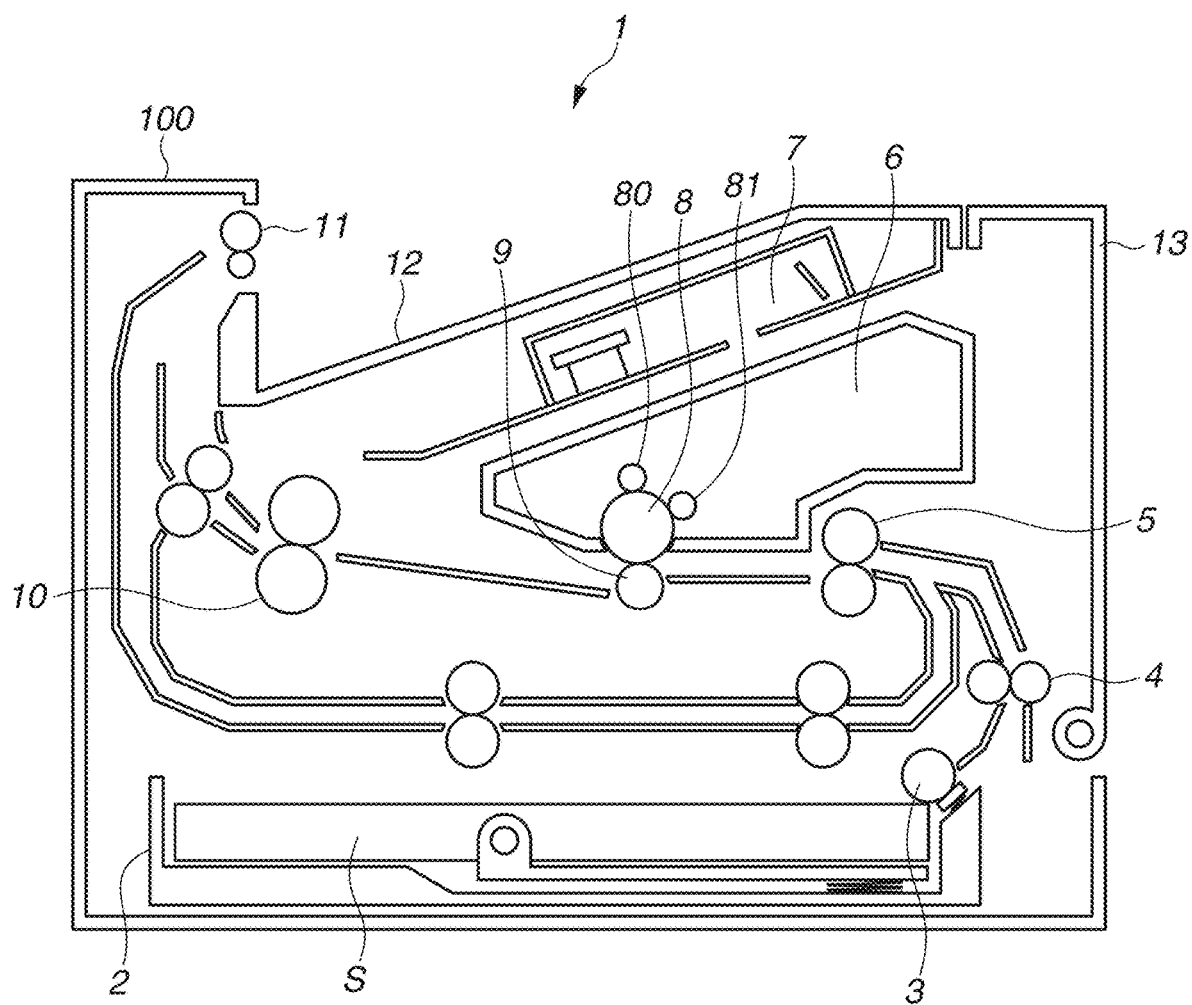
FIG. 1 is a cross-sectional view illustrating a configuration of an image forming apparatus.

FIG. 1 is a cross-sectional view illustrating an image forming apparatus 1 according to a first exemplary embodiment. The image forming apparatus 1 according to the present exemplary embodiment is a monochromatic laser beam printer employing the electrophotographic method. The image forming apparatus 1 forms an image on a recording medium, such as a recording sheet and an overhead projector (OHP) sheet, based on a signal transmitted from an external apparatus, such as a computer, that is connected and communicates with the image forming apparatus 1.

The image forming apparatus 1 includes a drum-shaped electrophotographic photosensitive member (hereinafter referred to as a photosensitive drum 8) as an image bearing member. The photosensitive drum 8 includes a cylindrical drum base made of aluminum or nickel, applied with a photosensitive agent, such as an organic light semiconductor (OPC), amorphous selenium, and an amorphous silicon. The photosensitive drum 8 is rotatably supported by a main body frame (not illustrated), and is driven to rotate at a predetermined speed by a driving source. The photosensitive drum 8 is surrounded by a charge member 80, a development member 81, and a transfer roller 9 serving as a transfer member, in this order along the rotational direction. An exposure apparatus 7 is disposed above the photosensitive drum 8. The photosensitive drum 8, the charge member 80, and the development member 81 are included in a process cartridge 6 that is integrally attachable to and detachable from an apparatus main body 100. The process cartridge 6 is attachable to and detachable from the apparatus main body 100 from an opening of a front door 13 on the front side of the image forming apparatus 1. The apparatus main body 100 is formed of the apparatus main body frame and outer surface members.

As another configuration, the image forming apparatus 1 includes a sheet cassette 2 for stacking recording media S, a feed roller 3, a conveyance roller pair 4, a registration roller pair 5, a fixing apparatus 10, a discharge roller 11, and a discharge tray 12 along a conveyance path of a recording medium S. These members will be described in detail below.

Operations of Image Forming Apparatus

Operations of the image forming apparatus 1 will be described below. The photosensitive drum 8 driven to rotate by the driving source is uniformly charged to a predetermined polarity and a predetermined potential by the charge member 80. The surface of the photosensitive drum 8 after the charging is subjected to image exposure based on image information by the exposure apparatus 7. Electrical charges of exposed portions are removed to form an electrostatic latent image. The electrostatic latent image is developed by the development member 81 to be visualized as a toner image. The toner image on the photosensitive drum 8 is transferred to the recording medium S by the transfer roller 9. The transfer roller 9 is biased toward the photosensitive drum 8 to form a transfer nip portion between the transfer roller 9 and the photosensitive drum 8. The transfer roller 9 performs a transfer operation for transferring the toner image on the photosensitive drum 8 (image bearing member) to the recording medium S at the transfer nip portion.

The recording medium S is fed from the sheet cassette 2 to the conveyance path by the feed roller 3. The recording medium S is conveyed to the transfer nip portion via the conveyance roller pair 4 and the registration roller pair 5. The toner image transferred from the photosensitive drum 8 to the recording medium S at the transfer nip portion is heated and fixed by the fixing apparatus 10. The recording medium S passed through the fixing apparatus 10 is discharged to the outside of the apparatus main body 100 by the discharge roller 11. The recording medium S discharged by the discharge roller 11 is held by the discharge tray 12.

Configuration of Outer Surface Members

The outer surface members that cover the outside of the apparatus main body 100 will be described below with reference to FIGS. 2A and 2B. In the apparatus main body 100 illustrated in FIGS. 2A and 2B, the front side is on the positive side in the direction of the X axis, the rear side is on the negative side in the direction of the X axis, the right-hand side is on the positive side in the direction of the Y axis, the left-hand side is on the negative side in the direction of the Y axis, the upper side is on the positive side in the direction of the Z axis, and the lower side is on the negative side in the direction of the Z axis. Preferably, the XY plane is parallel to the horizontal plane, and the Z direction is parallel to the vertical direction. FIG. 2A is a perspective view of the image forming apparatus 1 when viewed from the upper right direction of the front side. FIG. 2B is a perspective view of the image forming apparatus 1 when viewed from the upper left direction of the rear side.

As illustrated in FIGS. 2A and 2B, the front side of the apparatus main body 100 includes the front door 13, which is rotatable, and a cassette cover 20 for covering the front face of the sheet cassette 2 that can be drawn out from the front side of the apparatus main body 100. The front door 13 covering the front face also extends toward the top face of the apparatus main body 100. The part on the top face of the front door 13 is referred to as a top face part 13a. The top face of the apparatus main body 100 is provided with a discharge tray unit 21, which supports the discharged recording medium S, and a top cover 22. The top cover 22 is disposed at a part different from the top face part 13a and also different from a part where the discharge tray unit 21 covers the apparatus main body 100. The right-hand side face, the left-hand side face, and the rear face of the apparatus main body 100 are provided with a right cover 23, a left cover 24, and a rear cover 25, respectively.

The outer surface members of the apparatus main body 100 include the front door 13, the cassette cover 20, the discharge tray unit 21, the top cover 22, the right cover 23, the left cover 24, and the rear cover 25. Among the outer surface member of the apparatus main body 100, the front door 13 is disposed at a downstream portion in the direction in which the recording medium S is discharged onto the discharge tray unit 21.

Configuration of Discharge Tray Unit

Figure 3A:
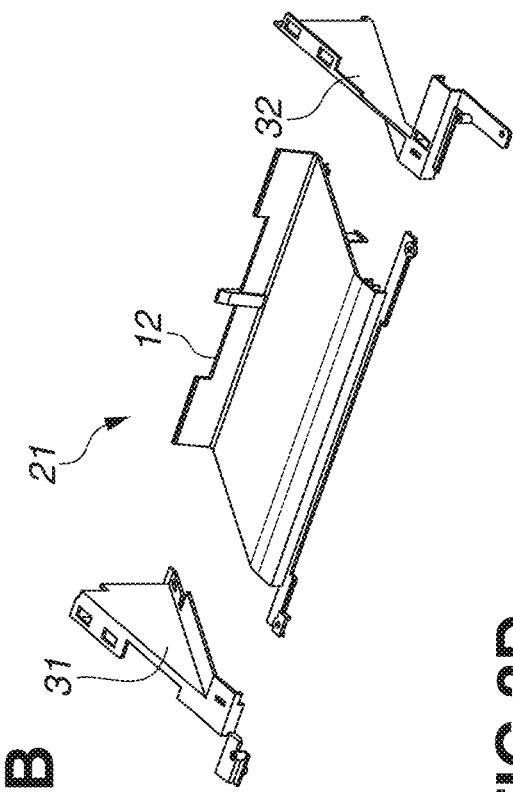
FIGS. 3A to 3D are diagrams illustrating a configuration of a discharge tray unit.

The discharge tray unit 21 will be described below with reference to FIGS. 3A to 3C, 4A, and 4B. As illustrated in FIG. 3A, the discharge tray unit 21 includes three different parts which are the discharge tray 12, a left-hand side wall 31, and a right-hand side wall 32. The discharge tray 12 has a stacking surface 29 for stacking the discharged recording medium S, and a stacking wall 28 on which an edge of the recording medium S on the upstream side in the recording medium S discharge direction abuts.

The stacking surface 29 having a shape inclined with respect to the horizontal plane leads the discharged recording medium S toward the stacking wall 28. The stacking wall 28 regulates the position of the upstream edge of the recording medium S in the discharge direction of the recording medium S stacked on the stacking surface 29. The left-hand side wall 31 and the right-hand side wall 32 regulate the positions of both edges of the recording medium S in the width direction perpendicular to the discharge direction of the recording medium S stacked on the stacking surface 29.

Figure 3B:
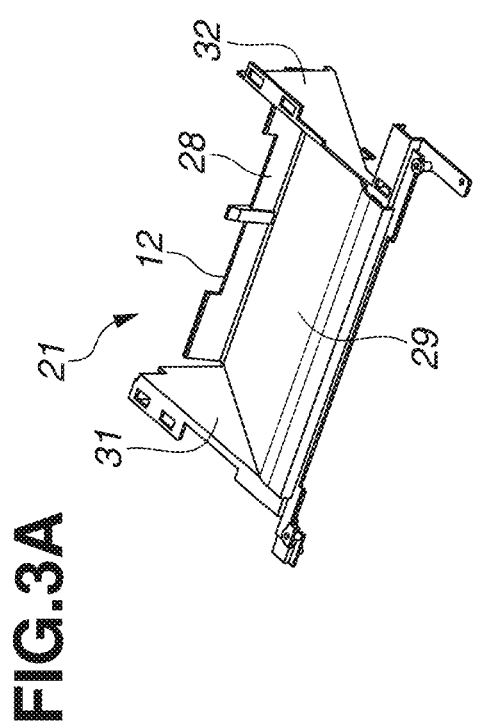

As illustrated in FIG. 3A, the discharge tray 12, the left-hand side wall 31, and the right-hand side wall 32 are assembled into the discharge tray unit 21. On the other hand, as illustrated in FIG. 3B, the discharge tray unit 21 can be disassembled into the three parts.

Figure 3C:
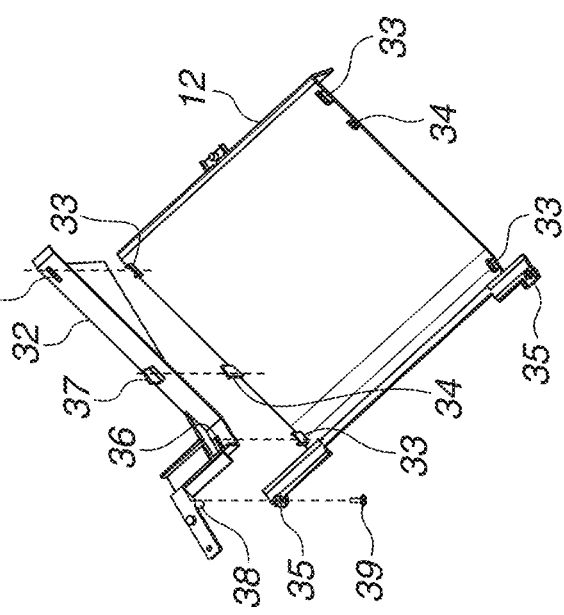

FIG. 3C is a perspective view illustrating the discharge tray 12 and the right-hand side wall 32 when viewed from the reverse side. As illustrated in FIG. 3C, on each of the right- and the left-hand sides of the discharge tray 12, two bosses 33, an engaging portion 34, and a fixing portion 35 are provided. The right-hand side wall 32 illustrated in FIG. 3C has holes 36 into which the bosses 33 on the discharge tray 12 are to be inserted, an engaged portion 37 to be engaged with the engaging portion 34, and a fixed portion 38 to be fixed by the fixing portion 35. Although the left-hand side wall 31 is not illustrated in FIG. 3C, the left-hand side wall 31 also has holes 36, an engaged portion 37, and a fixed portion 38, like the right-hand side wall 32. The fixing portions 35 on the discharge tray 12 and the fixed portions 38 on the left-hand side wall 31 and the right-hand side wall 32 are fixed to each other by insertion of fixing members 39, such as screws.

Figure 3D:
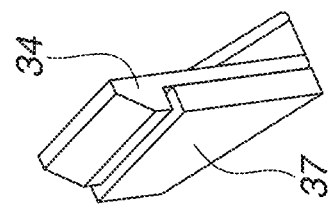

FIG. 3D is an enlarged view illustrating the engaging portion 34 of the discharge tray 12 and the engaged portion 37 of the right-hand side wall 32. The engaging portion 34 of the discharge tray 12 has a hook shape, and the engaged portion 37 of the right-hand side wall 32 has a rib shape. By the engagement of the engaging portion 34 having the hook shape on the discharge tray 12 with the engaged portion 37 having the rib shape on the right-hand side wall 32, the discharge tray 12 is engaged with the right-hand side wall 32. The discharge tray 12 is engaged with the left-hand side wall 31 in a similar way. By insertion of the bosses 33 on the right- and left-hand sides of the discharge tray 12 into the holes 36 on the right-hand side wall 32 and the left-hand side wall 31, respectively, each of the engaging portions 34 and corresponding one of the engaged portions 37 are engaged with each other, and then the fixing portions 35 and the fixed portions 38 are fixed by the fixing members 39. Thus, the discharge tray unit 21 is formed.

FIG. 4A is a cross-sectional view illustrating the discharge tray unit 21 according to the present exemplary embodiment. As illustrated in FIG. 4A, an angle formed by the discharge tray 12 and the left-hand side wall 31 and an angle formed by the discharge tray 12 and the right-hand side wall 32 are each indicated as an angle α having an approximate right angle. In this configuration, a distance between the left-hand side wall 31 and the right-hand side wall 32 is indicated as a distance A. FIG. 4B is a cross-sectional view illustrating a discharge tray unit 82 having a single piece configuration according to a comparative example. According to the comparative example, since the portions corresponding to the discharge tray 12, the left-hand side wall 31, and the right-hand side wall 32 are integrally formed, the discharge tray unit 82 cannot be disassembled into parts, unlike the present exemplary embodiment. Likewise, an angle formed by the portions corresponding to the discharge tray 12 and the left-hand side wall 31 and an angle formed by the portions corresponding to the discharge tray 12 and the right-hand side wall 32 are each indicated as an angle β. A distance between the portions corresponding to the left-hand side wall 31 and the right-hand side wall 32 is indicated as a distance B.

The angle β is larger than the angle α because of the following reason. The discharge tray unit 21 is a resin member that is made through injection molding. In the configuration of the present exemplary embodiment, the members of the discharge tray 12, the left-hand side wall 31, and the right-hand side wall 32 can be separately created. However, in the configuration of the comparative example, these members need to be integrally formed by using one mold. To prevent scuffing when the member is extracted from the mold in the configuration of the comparative example, the angle β is made larger than the angle α to provide a predetermined draft angle on inclinations of the left-hand side wall 31 and the right-hand side wall 32. Consequently, the distance B becomes longer than the distance A.

According to the present exemplary embodiment, the discharge tray 12, the left-hand side wall 31, and the right-hand side wall 32 can be configured in such a manner that the angle α becomes an approximate right angle. Accordingly, the distance A can be made shorter than the distance B according to the comparative example. This enables reducing the widthwise size of the image forming apparatus 1.

Detaching Process Cartridge

Figure 5B:
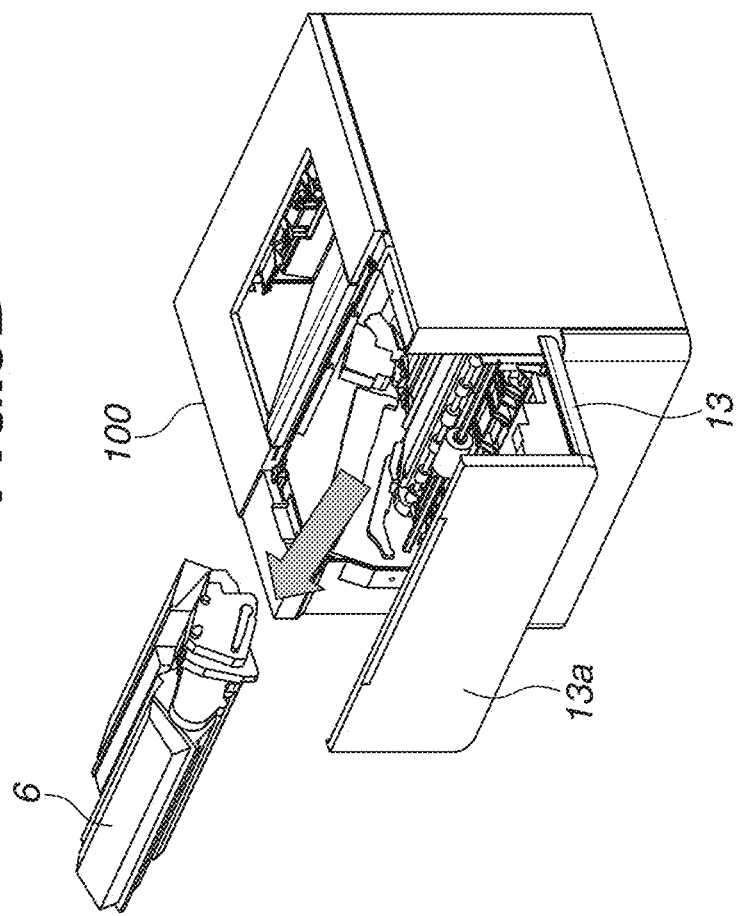
FIGS. 5A and 5B are diagrams illustrating a procedure for detaching a process cartridge from the image forming apparatus.
Figure 5A:
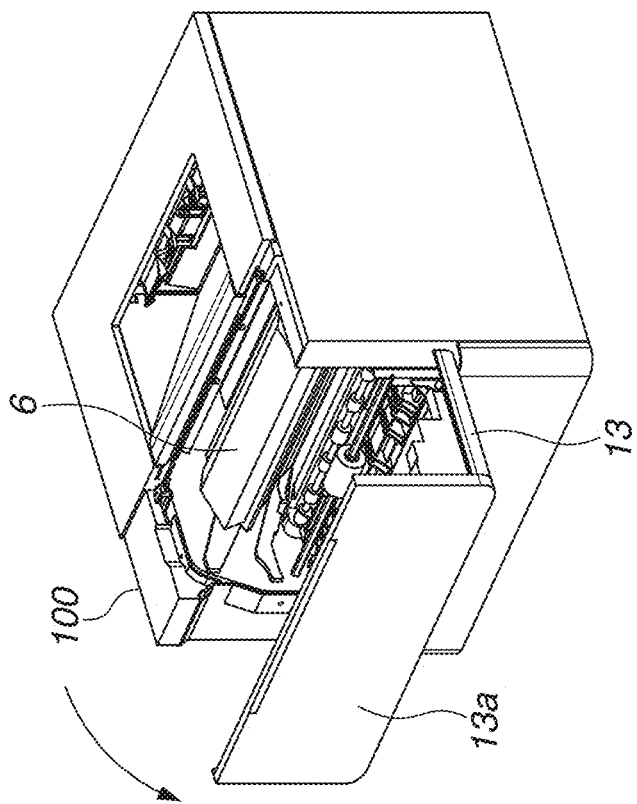

A procedure for detaching the process cartridge 6 will be described below with reference to FIGS. 5A and 5B. A side face of the image forming apparatus 1 is provided with a release button (not illustrated) for releasing the closed state of the front door 13. When the user operates the release button, the engagement state of the front door 13 and the apparatus main body 100 is released, and the front door 13 rotates as illustrated in FIG. 5A. By the rotation of the front door 13, the process cartridge 6 attached inside the apparatus main body 100 is partly exposed to the outside. When the user pulls out the exposed process cartridge 6 toward the front side, the process cartridge is detached from the apparatus main body 100, as illustrated in FIG. 5B.

Detaching Discharge Tray

A procedure for detaching the discharge tray 12 will be described below with reference to FIGS. 6A and 6B. By rotation of the front door 13 as illustrated in FIG. 6A, the portion corresponding to the top face part 13a of the front door 13 is also exposed to the outside. Consequently, the fixing portions 35 and the fixing members 39 that fix the discharge tray 12 to the apparatus main body 100 are exposed to the outside. The fixing portions 35 are fixed to the apparatus main body 100 via the fixing members 39, such as screws, together with the fixed portions 38 on the left-hand side wall 31 and the right-hand side wall 32. When detaching the discharge tray 12 from the apparatus main body 100, the user removes the fixing members 39 as illustrated in FIG. 6B and then pulls up the discharge tray 12. Thus, the engaging portions 34 on the discharge tray 12 are bent to release the engagement with the engaged portions 37 (illustrated in FIG. 3C). When the user pulls up the discharge tray 12 to take off the bosses 33 on the discharge tray 12 from the holes 36 (illustrated in FIG. 3C), the discharge tray 12 is detached from the apparatus main body 100. In this state, the left-hand side wall 31 and the right-hand side wall 32 remain in the apparatus main body 100.

Detaching Internal Unit

Figure 7B:
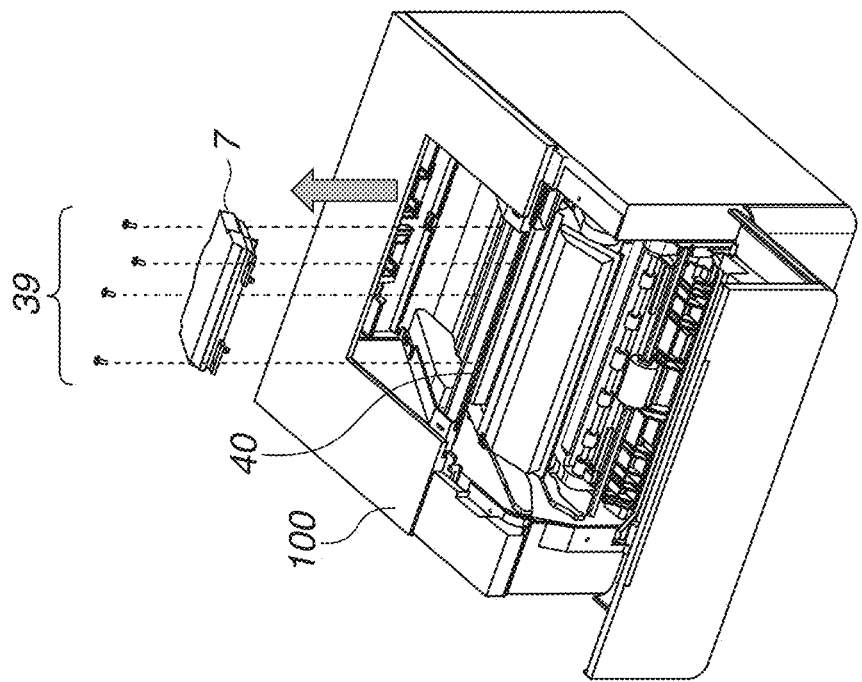
FIGS. 7A and 7B are diagrams illustrating a procedure for detaching an exposure apparatus according to the first exemplary embodiment.

A procedure for detaching an internal unit disposed below the discharge tray 12 (inside the apparatus main body 100) will be described below with reference to FIGS. 7A and 7B. According to the present exemplary embodiment, the internal unit is the exposure apparatus 7.

Figure 7A:
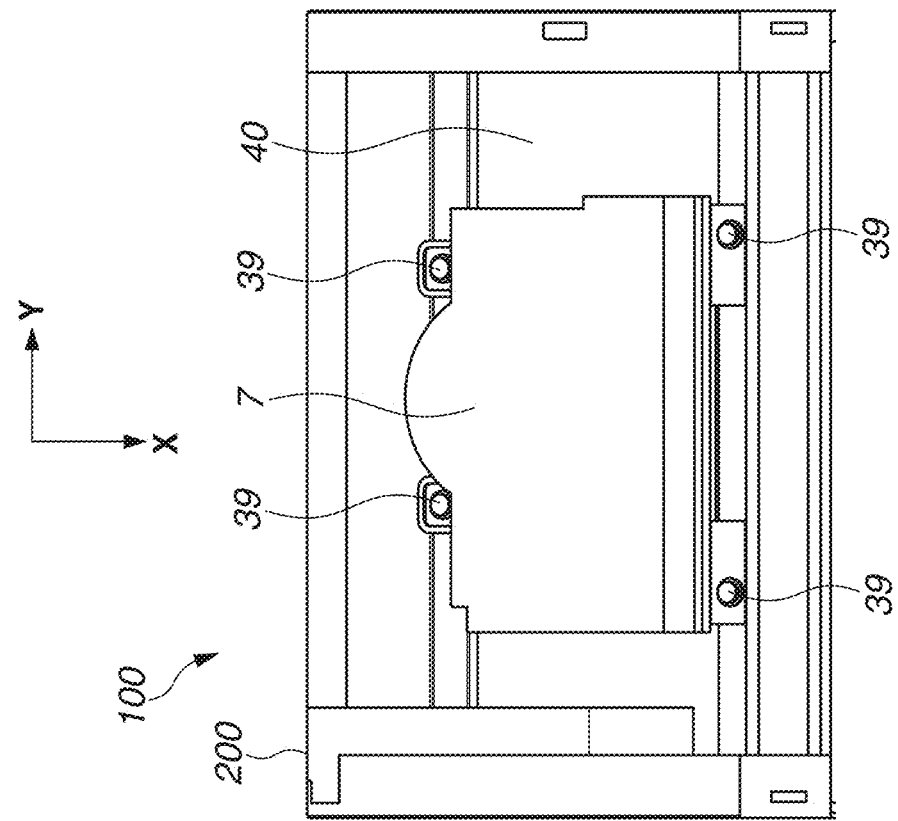

FIG. 7A is an enlarge view illustrating the vicinity of the exposure apparatus 7 with the discharge tray 12 detached, when viewed from above the apparatus main body 100. FIG. 7A illustrates an extract of an opening 200 that is exposed to the outside with the discharge tray 12 detached. The exposure apparatus 7 is fixed to a top frame 40 on the apparatus main body 100 by fixing members 39 at four different positions. In a state where the discharge tray 12 is detached, the exposure apparatus 7 and the four fixing members 39 are exposed to the outside of the image forming apparatus 1. Since the exposure apparatus 7 is smaller than the opening 200 in size, the user is able to access the exposure apparatus 7. When the fixing members 39 at four different positions are removed, as illustrated in FIG. 7B, the fixing state of the exposure apparatus 7 and the apparatus main body 100 is released, whereby the user can detach the exposure apparatus 7 from the apparatus main body 100.

Effects of Present Exemplary Embodiment

According to the configuration of the present exemplary embodiment, after detaching the discharge tray 12, the user can attach or detach the exposure apparatus 7 to or from the position below the discharge tray 12. According to the present exemplary embodiment, the user can separately detach the discharge tray 12 after opening the front door 13, whereby it is easier for the user to attach or detach the exposure apparatus 7 to or from the position below the discharge tray 12.

According to the configuration of the present exemplary embodiment, the user can also detach the discharge tray 12 from the apparatus main body 100 without removing the outer surface members other than the front door 13 (the cassette cover 20, the top cover 22, the right cover 23, the left cover 24, and the rear cover 25) from the apparatus main body 100. With this configuration, the user can access the exposure apparatus 7 easier than in the case of the conventional configuration.

Further, even after the discharge tray 12 is detached from the apparatus main body 100, the left-hand side wall 31 and the right-hand side wall 32 remain on the apparatus main body 100, whereby the user can replace the exposure apparatus 7 without touching unnecessary portions other than the exposure apparatus 7. This enables reducing a possibility that the user contacts other members and causes damage or failure to other members when accessing the exposure apparatus 7.

The configuration of an image forming apparatus 300 according to a second exemplary embodiment will be described below with reference to FIG. 8. The present exemplary embodiment (described below) has a similar configuration to the configuration according to the first exemplary embodiment, except for characteristic configurations, and thus the redundant descriptions will be omitted.

Overall Configuration of Image Forming Apparatus

Figure 8:
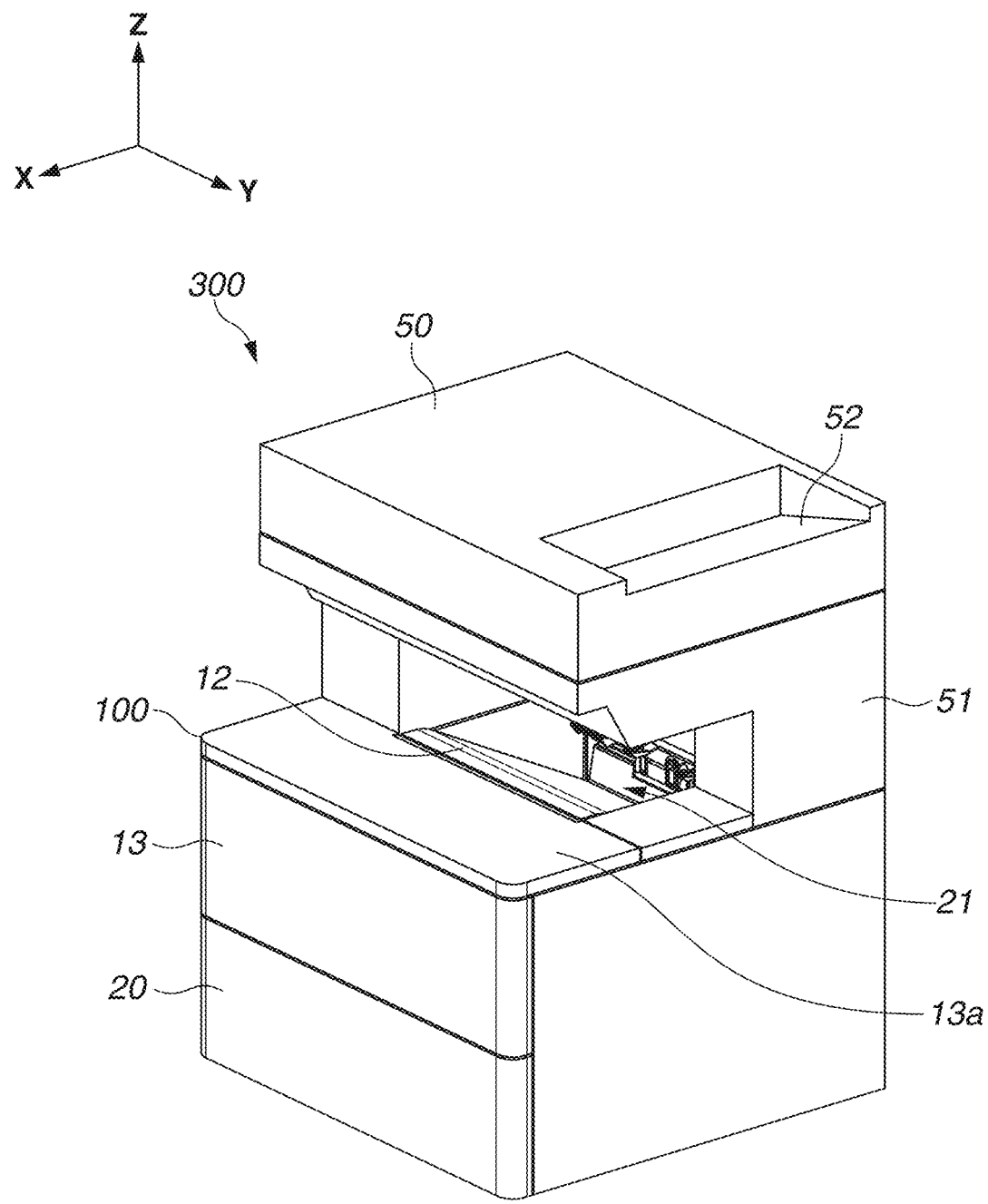
FIG. 8 is a block diagram illustrating an image forming apparatus according to a second exemplary embodiment.

As illustrated in FIG. 8, the image forming apparatus 300 according to the present exemplary embodiment includes the image forming apparatus 1 according to the first exemplary embodiment and a document reading apparatus 50. The top face of the apparatus main body 100 is provided with a support unit 51 that supports the document reading apparatus 50. The support unit 51 is disposed on the top face of the apparatus main body 100, at a part different from the top face part 13a of the front door 13 and the part of the discharge tray unit 21.

The document reading apparatus 50 includes a reading sensor for automatically conveying document sheets stacked on a tray 52 to read texts and images printed on each of the document sheets. The read image data can be transmitted to a computer connected with the image forming apparatus 300, or image forming on the recording medium S can be started based on the read image data to copy information described on the document. The document reading apparatus 50 may be attachable to and detachable from the apparatus main body 100 as an optional apparatus, or integrally formed with the apparatus main body 100.

In the configuration of the present exemplary embodiment, a space is provided between the discharge tray unit 21 and the document reading apparatus 50 so that the user can take out the recording medium S discharged onto the discharge tray 12. Similar to the configuration of the first exemplary embodiment, the front door 13 is configured to rotate for attachment and detachment of the process cartridge 6 from the apparatus main body 100.

Detaching Discharge Tray and Internal Unit

A procedure for detaching an internal unit disposed below the discharge tray 12 (inside the apparatus main body 100) will be described below with reference to FIGS. 9A and 9B. According to the present exemplary embodiment, the internal unit is the exposure apparatus 7.

When the front door 13 is rotated as illustrated in FIG. 9A, the portion corresponding to top face part 13a of the front door 13 is also exposed to the outside. Consequently, the fixing portions 35 and the fixing members 39 that fix the discharge tray 12 to the apparatus main body 100 are exposed to the outside. The fixing portions 35 are fixed to the apparatus main body 100 by fixing members 39, such as screws, together with the fixed portions 38 on the left-hand side wall 31 and the right-hand side wall 32. When detaching the discharge tray 12 from the apparatus main body 100, the user removes the fixing members 39 and then pulls up the discharge tray 12, as illustrated in FIG. 9B. Thus, the engaging portions 34 on the discharge tray 12 are bent to release the engagement with the engaged portions 37 (illustrated in FIG. 3C). When the user pulls up the discharge tray 12 to take off the bosses 33 on the discharge tray 12 from the holes 36 (illustrated in FIG. 3C), the discharge tray 12 is detached from the apparatus main body 100. When the discharge tray 12 is detached, the exposure apparatus 7 disposed below the discharge tray 12 is exposed to the outside, whereby the user can access the exposure apparatus 7. A procedure for detaching the exposure apparatus 7 is similar to the procedures according to the first exemplary embodiment, and thus the redundant description will be omitted.

In a case where the document reading apparatus 50 is disposed on the upper part of the apparatus main body 100 in the configuration of the present exemplary embodiment, the user can attach and detach the discharge tray 12 and the exposure apparatus 7 via the space for taking out the recording medium S stacked on the discharge tray 12.

Effects of Present Exemplary Embodiment

Even in a case where the document reading apparatus 50 is disposed on the upper part of the apparatus main body 100, the configuration of the present exemplary embodiment enables the user to separately detach the discharge tray 12, whereby the user can easily attach and detach the exposure apparatus 7 disposed below the discharge tray 12.

Although the present exemplary embodiment has been described above using an example where the document reading apparatus 50 is disposed on the upper part of the apparatus main body 100, the present invention is not limited thereto. A post-processing apparatus, such as a sorting unit for sorting the recording medium S on which an image has been formed into a plurality of bins, may be disposed on the upper part of the apparatus main body 100.

The configuration of an image forming apparatus 400 according to a third exemplary embodiment will be described below with reference to FIGS. 10, 11A, and 11B. The present exemplary embodiment described below has a similar configuration to the configuration according to the first exemplary embodiment, except for characteristic configurations, and thus the redundant descriptions will be omitted.

Overall Configuration of Image Forming Apparatus

According to the present exemplary embodiment, the recording medium S stacked on the sheet cassette 2 is conveyed from the left- to the right-hand side when viewed from the front face of the apparatus main body 100. Then, the recording medium S on which an image has been formed is discharged from the right- to the left-hand side by the discharge roller 11 and then stacked on the discharge tray 12. More specifically, the recording medium S is laterally conveyed with respect to the apparatus main body 100. In other words, according to the configuration of the present exemplary embodiment, the attachment and detachment direction of the sheet cassette 2 perpendicularly intersects with the discharge direction in which the recording medium S is discharged onto the discharge tray 12.

Figure 10:
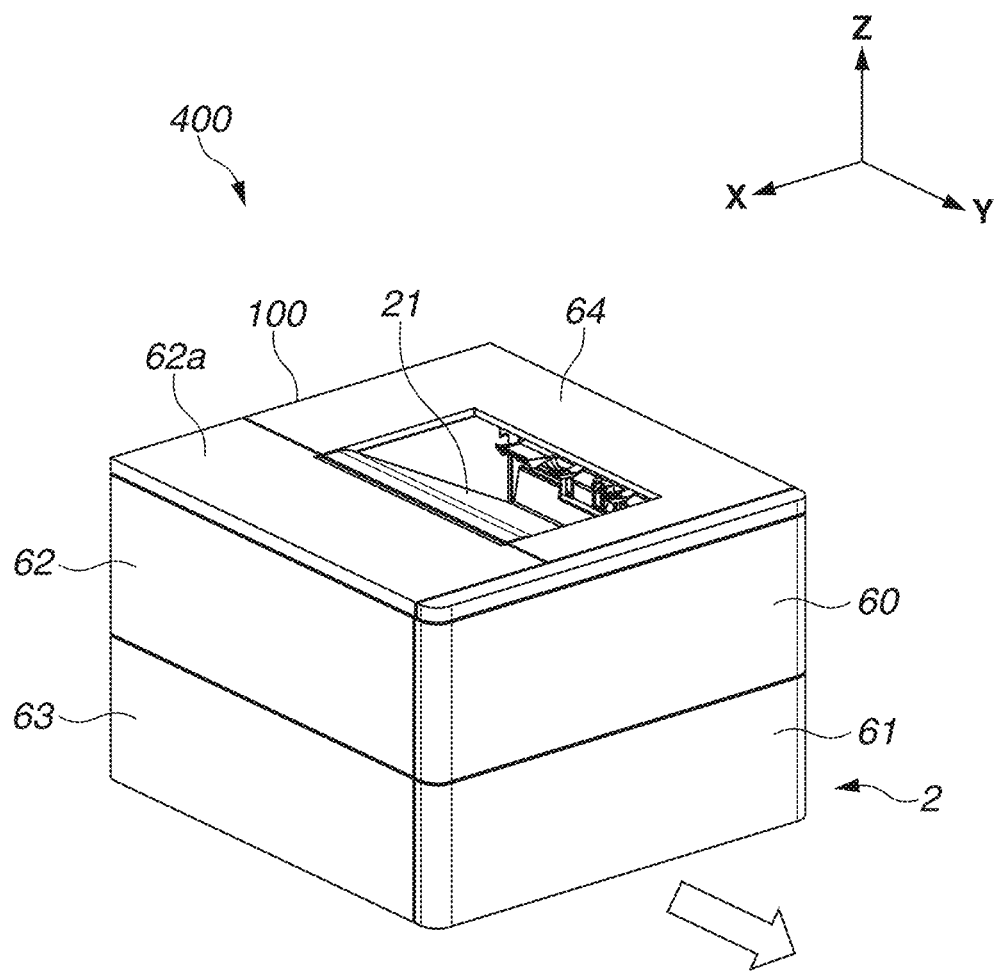
FIG. 10 is a diagram illustrating a configuration of an image forming apparatus according to a third exemplary embodiment.

FIG. 10 is a perspective view illustrating the image forming apparatus 400 that laterally conveys the recording medium S. In the image forming apparatus 400, referring to FIG. 10, the front side is the positive side in the direction of the Y axis, the rear side is the negative side in the direction of the Y axis, the left-hand side is the positive side in the direction of the X axis, the right-hand side is the negative side in the direction of X axis, the upper side is the positive side in the direction of the Z axis, and the lower side is the negative side in the direction of the Z axis. Preferably, the XY plane is parallel to the horizontal plane, and the Z direction is parallel to the vertical direction.

As illustrated in FIG. 10, the sheet cassette 2 can be drawn out from the front side of the apparatus main body 100, and a cassette cover 61 is provided on the front side of the sheet cassette 2. A front cover 60 fixed to the apparatus main body 100 is disposed above the cassette cover 61. A door for attaching and detaching the process cartridge 6 is disposed on the left-hand side of the apparatus main body 100 and rotates as a left door 62. The left door 62 covering the left-hand side also extends toward the top face of the apparatus main body 100. The part on the top face of the left door 62 is referred to as a top face region 62a. A left cover 63 fixed to the apparatus main body 100 is disposed below the left door 62. The top face of the apparatus main body 100 is provided with the discharge tray unit 21, which is for supporting the discharged recording medium S, and a top cover 64. The top cover 64 is disposed at a part different from the part where the top face region 62a and the discharge tray unit 21 cover the apparatus main body 100. The right-hand side and the rear side of the apparatus main body 100 are provided with a right cover and a rear cover (not illustrated), respectively.

The configuration of the discharge tray unit 21 is the same as that according to the first exemplary embodiment. More specifically, the discharge tray unit 21 includes the discharge tray 12, the left-hand side wall 31, and the right-hand side wall 32. However, according to the present exemplary embodiment, since the anteroposterior direction and the lateral direction are interchanged, as described in FIG. 10. For this reason, according to the present exemplary embodiment, the left-hand side wall 31 is referred to as a rear side wall, and the right-hand side wall 32 is referred to as a front side wall.

Detaching Discharge Tray and Internal Unit

Figure 11B:
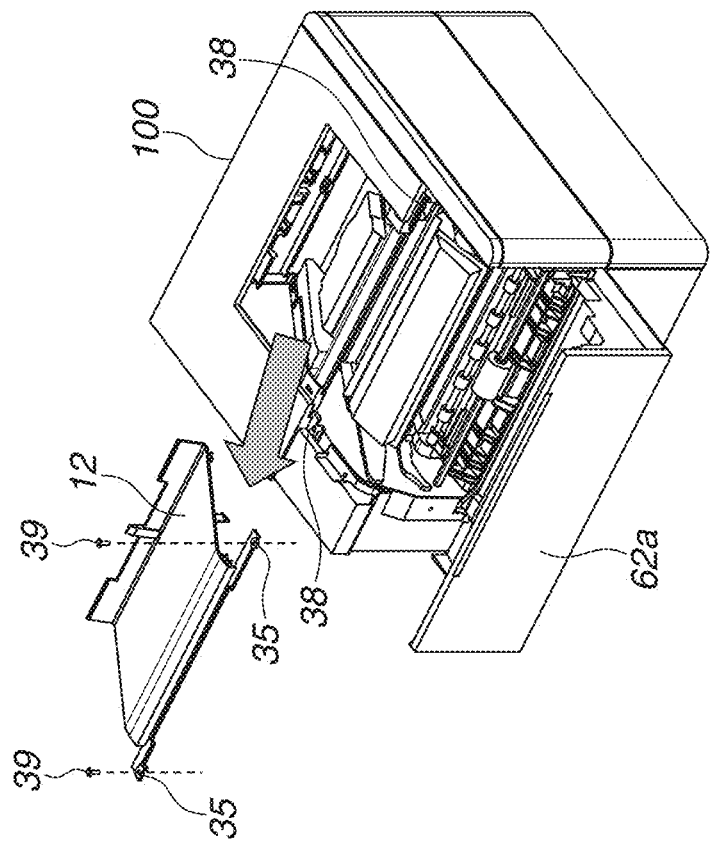
FIGS. 11A and 11B are diagrams illustrating a procedure for detaching a discharge tray according to the third exemplary embodiment.
Figure 11A:
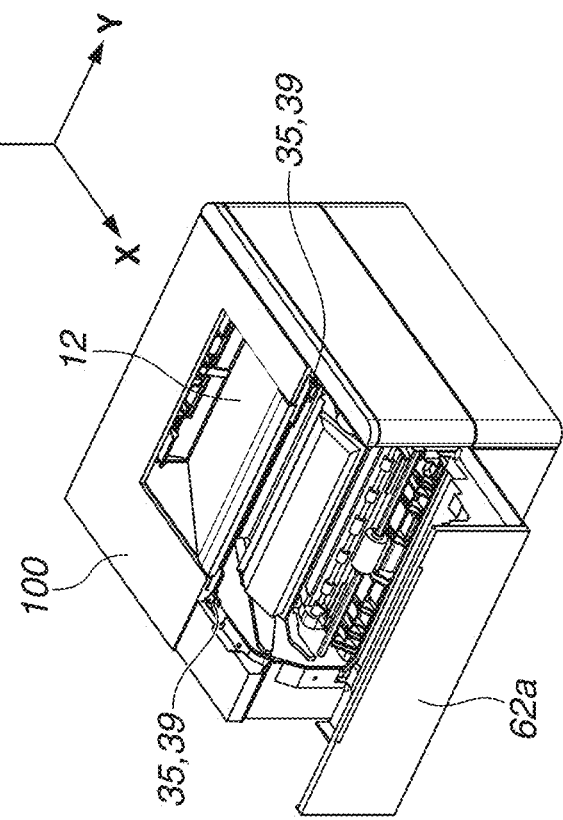

FIGS. 11A and 11B illustrate procedures for detaching the discharge tray 12 from the image forming apparatus 400 that laterally conveys the recording medium S. According to the present exemplary embodiment, the internal unit is the exposure apparatus 7.

When the left door 62 is rotated as illustrated in FIG. 11A, the portion corresponding to the top face region 62a of the left door 62 is also exposed to the outside. Consequently, the fixing portions 35 and the fixing members 39 that fix the discharge tray 12 to the apparatus main body 100 are exposed to the outside. The fixing portions 35 are fixed to the apparatus main body 100 by the fixing members 39, such as screws, together with the fixed portions 38 on the front and rear side walls. When detaching the discharge tray 12 from the apparatus main body 100, the user removes the fixing members 39 and then pulls up the discharge tray 12, as illustrated in FIG. 11B. Thus, the engaging portions 34 on the discharge tray 12 are bent to release the engagement with the engaged portions 37 (illustrated in FIG. 3C). When the user pulls up the discharge tray 12 to take off the bosses 33 on the discharge tray 12 from the holes 36 (illustrated in FIG. 3C), the discharge tray 12 is detached from the apparatus main body 100. When the discharge tray 12 is detached, the exposure apparatus 7 disposed below the discharge tray 12 is exposed to the outside, whereby the user can access the exposure apparatus 7. A procedure for detaching the exposure apparatus 7 is similar to the procedures according to the first exemplary embodiment, and the redundant description will be omitted.

Effects of Present Exemplary Embodiment

According to the configuration of the present exemplary embodiment, detaching the discharge tray 12 allows user to access the exposure apparatus 7 disposed below the discharge tray 12 to attach and detach the exposure apparatus 7, even in the image forming apparatus 400 that laterally conveys the recording medium S.

The configuration of the image forming apparatus 1 according to a fourth exemplary embodiment is the same as the configuration according to the first exemplary embodiment. The present exemplary embodiment differs from the first exemplary embodiment in that the internal unit to be attached and detached is not the exposure apparatus 7 but a discharge unit 70. The present exemplary embodiment (described below) has a similar configuration to that according to the first exemplary embodiment, except for characteristic configurations, and thus the redundant descriptions will be omitted.

Detaching Discharge Tray and Internal Unit

Figure 12C:
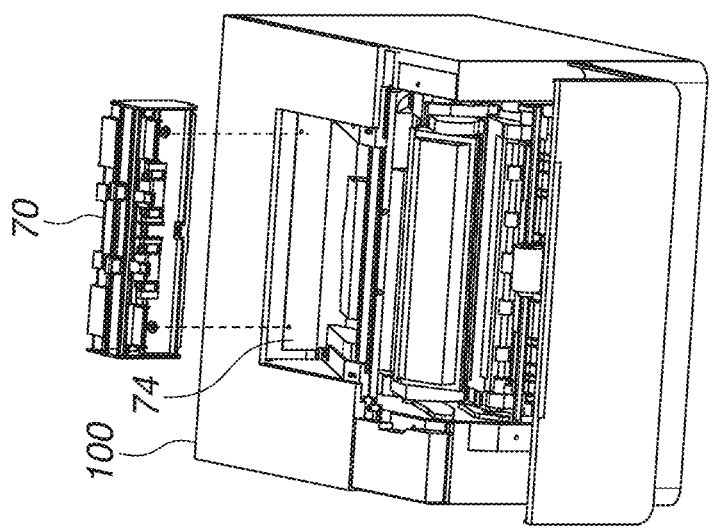
FIGS. 12A to 12C are diagrams illustrating a procedure for detaching a discharge unit according to a fourth exemplary embodiment.
Figure 12B:
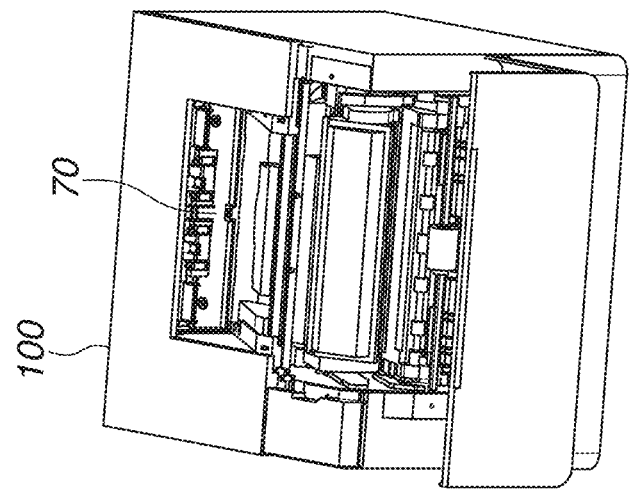
Figure 12A:
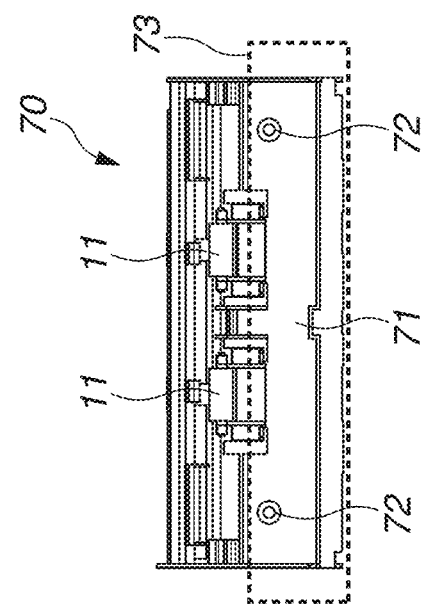

FIG. 12A illustrates the discharge unit 70 as an internal unit according to the present exemplary embodiment when viewed from the downstream side in the recording medium S conveyance direction. The discharge unit 70 includes discharge rollers 11 for discharging the recording medium S having passed through the fixing apparatus 10 onto the discharge tray 12, and a discharge frame 71 supporting the discharge rollers 11. The discharge frame 71 is provided with fixing portions 72 and is fixed to the apparatus main body 100 by the fixing members 39, such as screws. On the reverse side of the discharge unit 70, the apparatus main body 100 is provided with a frame 74 (illustrated in FIG. 12C), and the fixing members 39 penetrate through the discharge unit 70 to fix the discharge unit 70 to the frame 74.

Referring to FIG. 12A, a part 73 drawn with dotted lines is a part corresponding to the stacking wall 28 (illustrated in FIG. 3A) of the discharge tray 12 included in the discharge tray unit 21. More specifically, in a state where the discharge tray 12 is attached to the apparatus main body 100, a part of the discharge unit 70 including the fixing portions 72 is covered by the stacking wall 28.

The user can detach the discharge tray 12 from the apparatus main body 100 with a similar procedure to the procedures according to the first exemplary embodiment. As illustrated in FIG. 12B, when the discharge tray 12 is detached from the apparatus main body 100, the fixing portions 72 of the discharge unit 70 covered by the stacking wall 28 are exposed to the outside. As illustrated in FIG. 12C, removing the fixing members 39 allows the user to detach the discharge unit 70 from the apparatus main body 100.

Effects of Present Exemplary Embodiment

According to the configuration of the present exemplary embodiment, detaching the discharge tray 12 allows the discharge unit 70 disposed on the rear face of the discharge tray 12 to be attached and detached.

Although the present exemplary embodiment has been described above centering on a configuration in which the discharge unit 70 can be accessed based on the configuration of the first exemplary embodiment, the present invention is not limited thereto. Configurations of a second and a third exemplary embodiments are also applicable.

Modifications

The first to the fourth exemplary embodiments have been described above centering on a configuration in which the front door 13 and the left door 62 are opened to detach the discharge tray 12 from the apparatus main body 100. The front door 13 and the left door 62 have been described above as doors for use in replacement of the process cartridge 6. However, the present invention is not limited thereto. Opening the front door 13 and the left door 62 may allow a waste toner box for collecting waste toner generated during image forming to be replace. Alternatively, opening the front door 13 and the left door 62 may move a guide member forming the conveyance path of the recording medium S to open up the conveyance path. In this configuration, in a case where a jam occurs, the user can take the recording medium S out of the apparatus main body 100.

According to the above-described first to third exemplary embodiments, the discharge tray unit 21 includes three different parts which are the discharge tray 12 including the stacking surface 29 and the stacking wall 28, the left-hand side wall 31, and the right-hand side wall 32, and thus it is possible to separately detach the discharge tray 12. However, the present invention is not limited thereto. Similar effects can also be obtained by separating the stacking surface 29 and the stacking wall 28 of the discharge tray 12, disposing the stacking wall 28 in the apparatus main body 100, and attaching and detaching the discharge tray 12 having the stacking surface 29.

In the above-described first to third exemplary embodiments, the internal unit is the exposure apparatus 7. In the above-described fourth exemplary embodiment, the internal unit is the discharge unit 70. However, the internal unit is not limited thereto.

For example, the internal unit may be a bundle wire extending over the left-hand side wall 31 and the right-hand side wall 32 or an electrical circuit board. In this case, the left-hand side wall 31 and the right-hand side wall 32 may be configured to be detached at the same time, together with the discharge tray 12.

In the above-described first to fourth exemplary embodiments, the accessibility to an internal unit is defined, for example, based on three different viewpoints. One viewpoint is that the opening 200 (illustrated in FIG. 7B), formed by detaching the discharge tray 12 from the apparatus main body 100, is larger in size (outer shape) than the internal unit. Another viewpoint is that, when the discharge tray 12 is detached from the apparatus main body 100, the fixing members 39 that fix the internal unit to the apparatus main body 100 are exposed to the outside. Still another viewpoint is that, when the discharge tray 12 is detached from the apparatus main body 100, the entire internal unit is exposed to the outside.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076247, filed Apr. 28, 2021, which is hereby incorporated by reference herein in its entirety.

What is claimed is:

1. An image forming apparatus for forming an image on a recording medium, the image forming apparatus comprising:
   a discharge tray configured to support the recording medium, wherein the recording medium is a recording medium on which the image has been formed and which has been discharged to an outside of an apparatus main body of the image forming apparatus;
   an internal unit disposed inside the apparatus main body and which is any one of the following: a scanner unit for irradiating an image bearing member with light, a bundle wire, or an electrical circuit board; and a door configured to be opened and closed by rotating around an axis to expose and cover a fixing member that removeably attaches the discharge tray to the image forming apparatus, wherein the discharge tray and the door are part of outer surface members of the apparatus main body of the image forming apparatus, wherein, by rotating the door to open the door, the fixing member is exposed to the outside of the apparatus main body and is accessible to be detached from the apparatus main body, and wherein detaching of the fixing member from the apparatus main body and then detaching the discharge tray from the apparatus main body allows the internal unit to be accessed without detaching the outer surface members of the apparatus main body other than the discharge tray.

2. The image forming apparatus according to claim 1, further comprising a first side wall and a second side wall each disposed on a different one of both edges of the discharge tray in a recording medium width direction perpendicularly intersecting with a discharge direction of the recording medium discharged onto the discharge tray, wherein the first side wall and the second side wall are configured to regulate a widthwise position of the recording medium supported by the discharge tray, and wherein, in a state where the first side wall and the second side wall are attached to the apparatus main body, the discharge tray is separated from the first side wall and the second side wall and is detached from the apparatus main body.

3. The image forming apparatus according to claim 1, further comprising a cartridge configured to be attached to and detached from the apparatus main body, wherein opening of the door allows the cartridge to be attached to and detached from the apparatus main body.

4. The image forming apparatus according to claim 1, further comprising a guide member configured to form a conveyance path of the recording medium, wherein, by opening of the door, the guide member moves to open up the conveyance path.

5. The image forming apparatus according to claim 1, further comprising a waste toner box configured to be attached to and detached from the apparatus main body, wherein opening of the door allows the waste toner box to be attached to and detached from the apparatus main body.

6. The image forming apparatus according to claim 1, wherein the internal unit is disposed below the discharge tray in a vertical direction, and wherein, when viewed from an upper side to a lower side in the vertical direction, an opening exposed by detaching the discharge tray from the apparatus main body is larger in size than the internal unit.

7. The image forming apparatus according to claim 6, wherein the internal unit is the scanner unit configured to irradiate an image bearing member with light.

8. The image forming apparatus according to claim 1, further comprising a document reading apparatus disposed above the discharge tray in a vertical direction and configured to read a document.

9. The image forming apparatus according to claim 1, wherein the door is disposed on a downstream side in a discharge direction of the recording medium discharged onto the discharge tray.

10. The image forming apparatus according to claim 1, further comprising a sheet cassette configured to be attached to and detached from the apparatus main body and to support the recording medium, wherein an attachment and detachment direction of the sheet cassette is parallel to a discharge direction of the recording medium discharged onto the discharge tray.

11. The image forming apparatus according to claim 1, further comprising a sheet cassette configured to be attached to and detached from the apparatus main body and to support the recording medium, wherein an attachment and detachment direction of the sheet cassette is perpendicular to a discharge direction of the recording medium discharged onto the discharge tray.

12. An image forming apparatus for forming an image on a recording medium, the image forming apparatus comprising:

a discharge tray configured to support the recording medium, wherein the recording medium is a recording medium on which the image has been formed and which has been discharged to an outside of an apparatus main body of the image forming apparatus;

an internal unit disposed inside the apparatus main body;

a door configured to be opened and closed by rotating around an axis to expose and cover a fixing member that removeably attaches the discharge tray to the image forming apparatus; and a cartridge for being attached to and detached from the apparatus main body, wherein opening of the door allows the cartridge to be attached to and detached from the apparatus main body, wherein the discharge tray and the door are part of outer surface members of the apparatus main body of the image forming apparatus, wherein, by rotating the door to open the door, the fixing member is exposed to the outside of the apparatus main body and is accessible to be detached from the apparatus main body, and wherein detaching of the fixing member from the apparatus main body and then detaching the discharge tray from the apparatus main body allows the internal unit to be accessed without detaching the outer surface members of the apparatus main body other than the discharge tray.

13. The image forming apparatus according to claim 12, further comprising a first side wall and a second side wall each disposed on a different one of both edges of the discharge tray in a recording medium width direction perpendicularly intersecting with a discharge direction of the recording medium discharged onto the discharge tray, wherein the first side wall and the second side wall are configured to regulate a widthwise position of the recording medium supported by the discharge tray, and wherein, in a state where the first side wall and the second side wall are attached to the apparatus main body, the discharge tray is separated from the first side wall and the second side wall and is detached from the apparatus main body.

14. The image forming apparatus according to claim 12, further comprising a guide member configured to form a conveyance path of the recording medium, wherein, by opening of the door, the guide member moves to open up the conveyance path.

15. The image forming apparatus according to claim 12, further comprising a waste toner box configured to be attached to and detached from the apparatus main body, wherein opening of the door allows the waste toner box to be attached to and detached from the apparatus main body.

16. The image forming apparatus according to claim 12, wherein the internal unit is disposed below the discharge tray in a vertical direction, and
wherein, when viewed from an upper side to a lower side in the vertical direction, an opening exposed by detaching the discharge tray from the apparatus main body is larger in size than the internal unit.

17. The image forming apparatus according to claim 12, wherein the internal unit is the scanner unit configured to irradiate an image bearing member with light.

18. The image forming apparatus according to claim 12, further comprising a document reading apparatus disposed above the discharge tray in a vertical direction and configured to read a document.

19. The image forming apparatus according to claim 12, wherein the door is disposed on a downstream side in a discharge direction of the recording medium discharged onto the discharge tray.

20. The image forming apparatus according to claim 12, further comprising a sheet cassette configured to be attached to and detached from the apparatus main body and to support the recording medium,
wherein an attachment and detachment direction of the sheet cassette is parallel to a discharge direction of the recording medium discharged onto the discharge tray.

21. The image forming apparatus according to claim 12, further comprising a sheet cassette configured to be attached to and detached from the apparatus main body and to support the recording medium,
wherein an attachment and detachment direction of the sheet cassette is perpendicular to a discharge direction of the recording medium discharged onto the discharge tray.

22. An image forming apparatus for forming an image on a recording medium, the image forming apparatus comprising:
a discharge tray unit having a first side wall, a second side wall, and a discharge tray removeably attached to the first side wall and the second side wall by a fixing member as a surface of the discharge tray unit that is for stacking, outside of the image forming apparatus, the recording medium on which the image has been formed;
an internal unit having electronics and removeably disposed inside the apparatus main body at a position below the discharge tray; and
a door configured to be opened and closed by rotating around an axis to expose and cover the fixing member that removeably attaches the discharge tray to the first side wall and the second side wall,
wherein the discharge tray and the door are part of outer surface members of an apparatus main body of the image forming apparatus, and
wherein, by rotating the door to open the door, the fixing member becomes accessible to be detached, and, by detaching the fixing member and then detaching the discharge tray from the first and second side walls such that the first and second side walls remain attached to the apparatus main body, the internal unit can be detached from the apparatus main body and brought out through an opening exposed by detaching the discharge tray from the apparatus main body, without detaching the remaining outer surface members other than the discharge tray.

23. The image forming apparatus according to claim 22, wherein the first side wall and the second side wall of the discharge tray unit extend in a direction of gravity and are approximately parallel to each other with no draft angle between the first side wall and the second side wall.

24. The image forming apparatus according to claim 23, wherein the first side wall and the second side wall of the discharge tray unit are removeably attached to the image forming apparatus such that the discharge tray unit can be detached from the image forming apparatus when the discharge tray, the first side wall, and the second side wall are assembled as three parts of the discharge tray unit.

25. The image forming apparatus according to claim 23,
wherein the discharge tray unit is a first discharge tray unit in which the first and second side walls are resin members made through injection molding and have distal ends that are separated from each other by a first distance A when assembled into the discharge tray unit, and
wherein, in a case of a second discharge tray unit resin injected molded as a single piece configuration where first and second side walls of the second discharge tray unit are at a draft angle to each other and have distal ends that are separated from each other by a second distance B, the first distance A is shorter that the second distance B such that a widthwise size of the image forming apparatus having the multipiece configuration first discharge tray unit is reduced as compared to a widthwise size of the image forming apparatus having the single piece configuration second discharge tray unit.

26. The image forming apparatus according to claim 22, wherein the internal unit having the electronics is a serviceable part configured to be detached and replaced by a service engineer after failing or reaching an end of life.

27. The image forming apparatus according to claim 22, wherein the image forming apparatus is a monochromatic laser beam printer configured to employ an electrophotographic method.

28. The image forming apparatus according to claim 22, further comprising a top cover disposed on a top of the image forming apparatus as part of the outer surface members,
wherein the door includes a top face part that is disposed on the top of the image forming apparatus as a part different from the top cover.

29. The image forming apparatus according to claim 22, wherein the door includes a top face part disposed as part of the outer surface members above a space configured to receive a process cartridge, the image forming apparatus further comprising:
a document apparatus configured to read a document or to sort the recording medium on which the image has been formed into a plurality of bins; and
a support unit provided adjacent to the top face part and below the document apparatus to support the document apparatus,
wherein the document apparatus is an expansion unit supported above the discharge tray in a vertical direction in a way that the internal unit having the electronics is serviceable part configured to be detached and replaced by a service engineer without first moving the document apparatus.

30. The image forming apparatus according to claim 22, further comprising a sheet cassette configured to be attached to and detached from the apparatus main body and to support the recording medium, wherein an attachment and detachment direction of the sheet cassette is perpendicular to a discharge direction of the recording medium discharged onto the discharge tray.

31. The image forming apparatus according to claim 22, wherein the discharge tray includes a stacking surface configured to stack the discharged recording medium, and a stacking wall configured to regulate a position of an upstream end of the recording medium in a discharge direction of the recording medium discharged onto the stacking surface, and wherein detaching the discharge tray includes detaching the stacking surface from the first and second side walls such that the first and second side walls and the stacking wall remain attached to the apparatus main body.

32. The image forming apparatus according to claim 22, wherein the internal unit having the electronics is any one of the following: a scanner unit for irradiating an image bearing member with light, a bundle wire, or an electrical circuit board.

\* \* \* \* \*